United States Patent Office 3,212,473
Patented Oct. 19, 1965

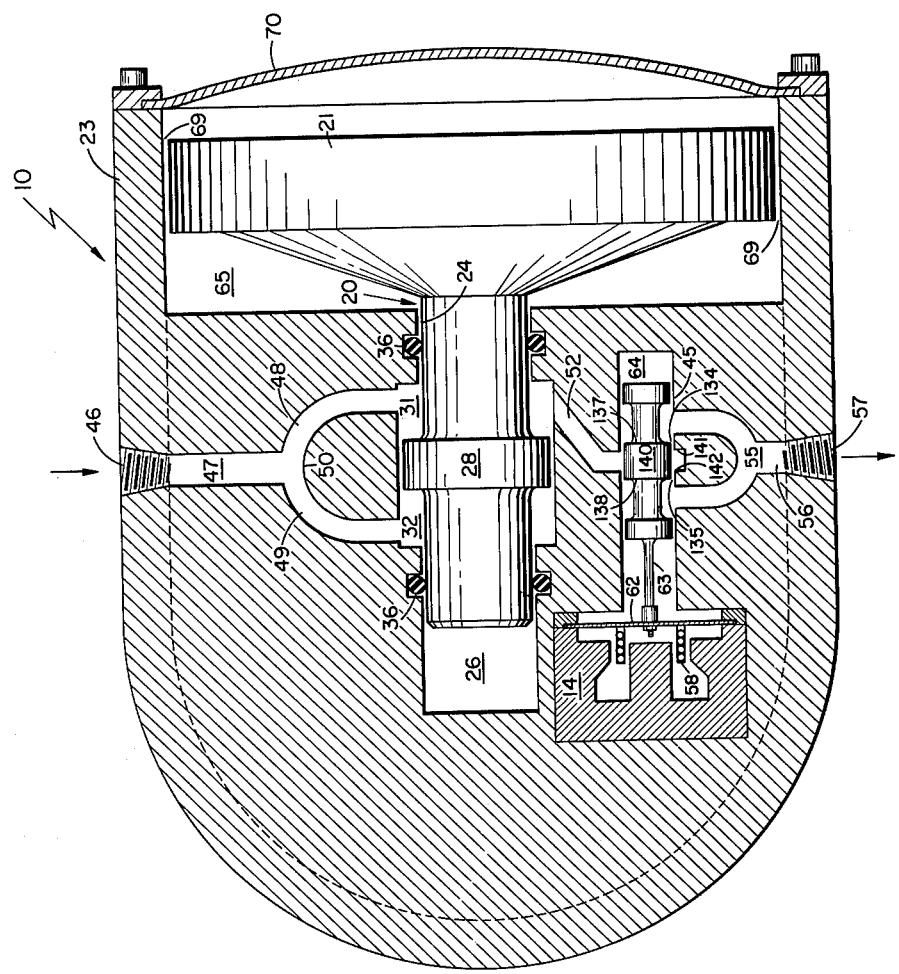

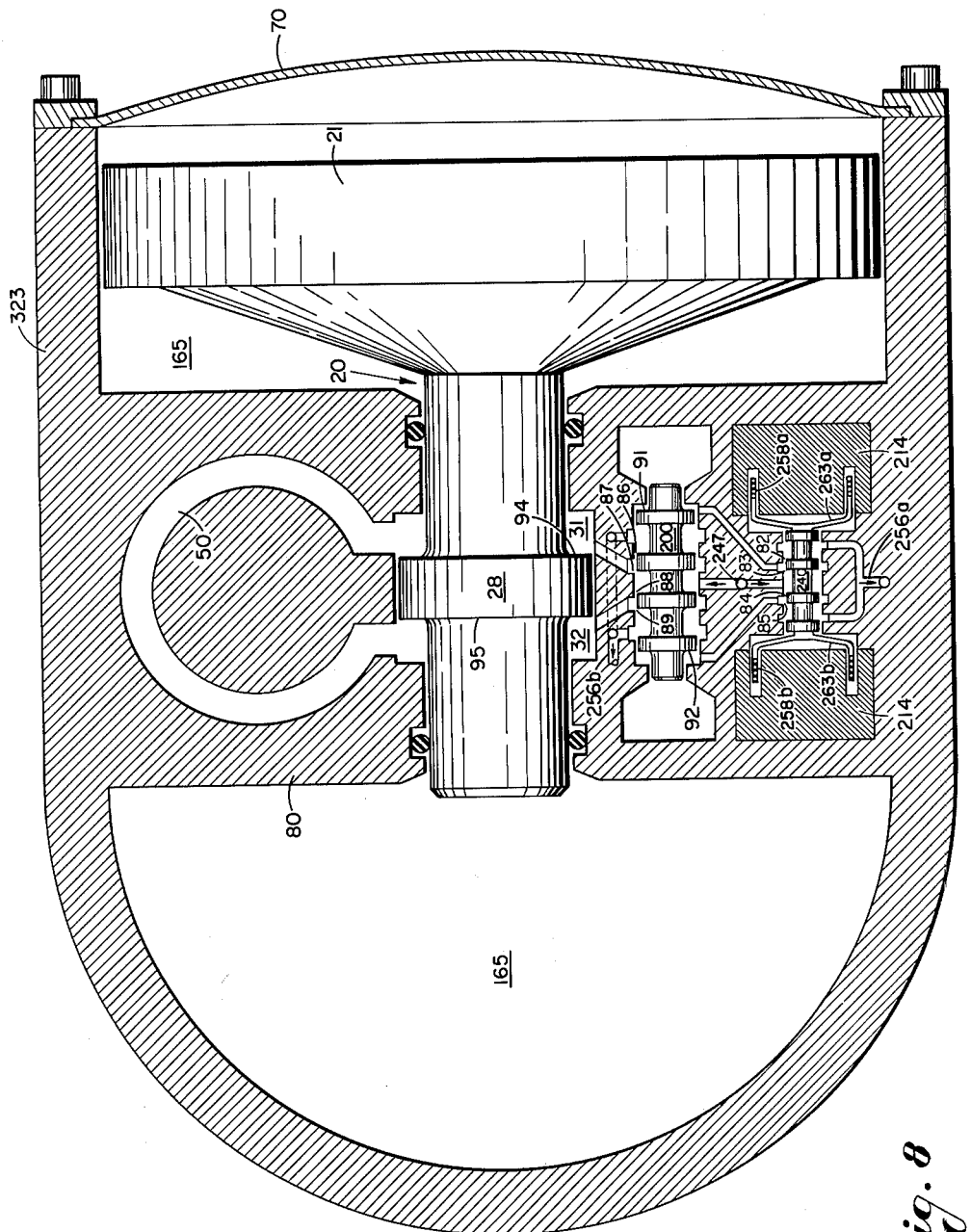

3,212,473
HYDROACOUSTIC TRANSDUCER
John V. Bouyoucos, 10 Blossom Circle E.,
Rochester 10, N.Y.
Filed Nov. 10, 1961, Ser. No. 151,516
12 Claims. (Cl. 116—137)

This invention relates to electro-hydroacoustic transducers for generating acoustic energy over a relatively broad frequency band from the flow of hydraulic fluids under pressure, characterized in that a high level of acoustic energy can be radiated in response to a low level electrical input control signal.

Acoustic vibration generators of the self-excited oscillator type are known which convert hydraulic flow energy into acoustic energy when the flow of fluid medium in a closed path is modulated repetitively, as by a valving element. In so doing, pressure variations are originated in one or more acoustical chambers arising from the alternate fluid acceleration and deceleration accompanying the modulatory process. These pressure variations then may be transmitted by an acoustical feedback path to one or more regions where they can react in such a manner as to sustain the valving action, thereby producing a pulsating flow of the fluid medium for generating acoustical energy. Examples of such devices are shown in United States Letters Patent No. 2,792,804 for "Acoustic-Vibration Generator and Method," issued to John V. Bouyoucos and Frederick V. Hunt on May 21, 1957, and also in an application for United States Letters Patent Serial No. 88,164, entitled "Acoustic Vibration Generator and Coupler," filed February 9, 1961 by John V. Bouyoucos.

Hydroacoustic oscillator-amplifiers are shown in FIGS. 20–23 of the aforesaid patent and also in an application for United States Letters Patent Serial No. 124,658, entitled "Hydroacoustic Oscillator-Amplifier," filed July 17, 1960 by John V. Bouyoucos now U.S. Patent No. 3,105,460, wherein acoustic pressures generated within the oscillator portion of the device act to excite the flow modulating means of the amplifier portion of the device. The input excitation to the amplifier thereby is derived from the hydroacoustic oscillator.

In each of these previous devices, acoustic pressures developed by self-excited means are responsible for the actuation of the flow modulating means. In addition, in each of these devices proposed, a portion of the acoustic energy developed by the flow modulating process may be stored in a resonant acoustic tank circuit, and a further portion then transferred through a load coupling circuit to a suitable load.

In accordance with this invention, the actuation of the flow modulating means is derived not from self-excited means but from an input electrical control signal which is converted by electromechanical means to mechanical motion of a valving element to convert the hydraulic flow energy to acoustic energy. The resulting acoustic signal accompanying the modulating process may be coupled directly to an acoustic load or may be used to drive one or more subsequent valve stages of larger displacement, thereby providing greater power amplification of the input control signal. Whereas the self-excited oscillator is inherently a single frequency device, the electro-hydroacoustic transducer of this invention, by virtue of its control by an externally derived electrical signal input, has a broadband capability limited by the effective Q of the acoustic tank circuit and the load coupling circuit.

Another feature of the invention is the incorporation of an acoustic inertance in shunt with the acoustic compliance of the chambers to which the load coupling means is exposed. In the prior devices, wherein a portion of the acoustic energy developed by the valving action reacts back upon the valving means so as to sustain the valving action, the acoustic tank circuit is formed by the acoustic compliance of said chambers and the acoustic inertance of the valving means.

In the electro-hydroacoustic transducer, however, the mass of the valving means no longer combines with the compliance of the chambers to form a parallel resonant circuit. In the absence of a shunt acoustic inertance, which provided in accordance with the invention the compliance of the chambers forms a reactive branch which is in parallel with the series connection of the mass of the load coupling member and the compliance associated with said member.

For high efficiency operation, the flow modulating means should encounter a resistive load; in other words, in the absence of shunt inertance the circuit including the compliance of the acoustic chambers and the load coupling circuit should be tuned to resonance. Moreover, the load coupling circuit should by itself be in resonance in order to achieve optimum power transfer of acoustic energy to the load, for a given driving force. It is evident, therefore, that both of these conditions cannot be satisfied concurrently. By introducing an acoustic inertance in parallel with the acoustic compliance of the aforesaid chambers, however, an acoustic tank circuit may be formed which is effectively in parallel with the series connected load coupling circuit. Both of these circuits now can be tuned independently to resonance and conditions conducive simultaneously to high efficiency operation, as well as optimum power transfer, become possible. The acoustic inertance may be achieved by means of a hydraulic line interconnecting the two acoustic chambers; this line may be a part of the hydraulic feed line located on the high pressure side of the system.

Other objects, features and advantages of this invention will become apparent from the description, taken in conjunction with the drawings wherein:

FIG. 1A is a fragmentary diagram showing a modification of the electro-hydroacoustic transducer system shown in FIG. 1;

FIG. 5 illustrates in central cross-section a transducer wherein single-ended valving is employed to drive a radiating means in push-pull;

Figure 7:
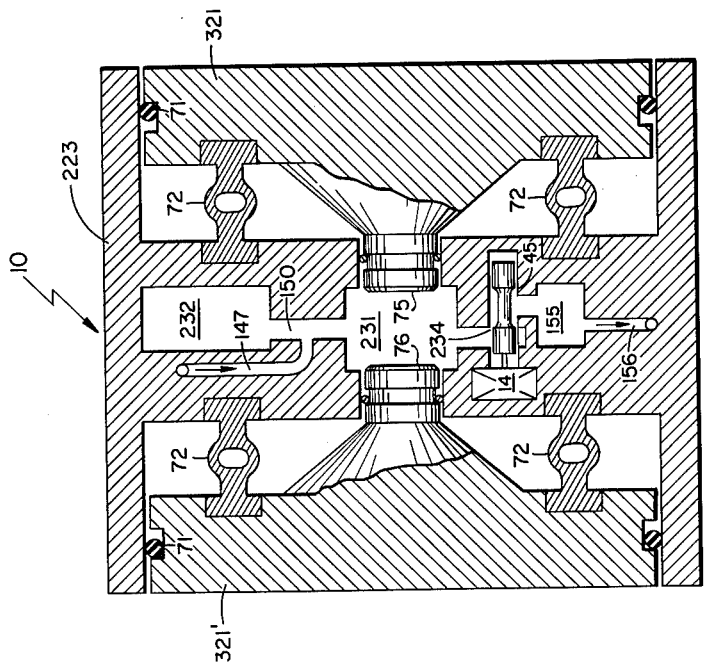
Figure 6:
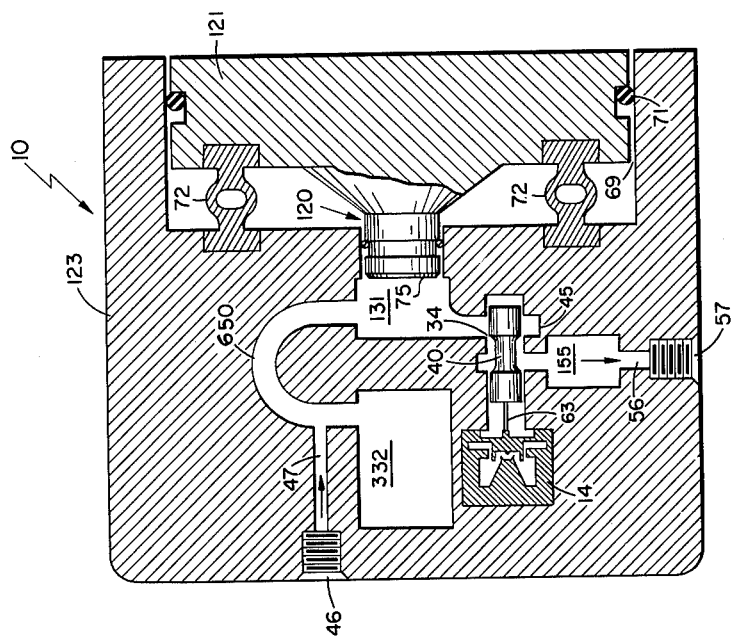
FIG. 6 is a central cross-sectional view of a transducer incorporating single-ended valving and single-ended drive.
Figure 9:
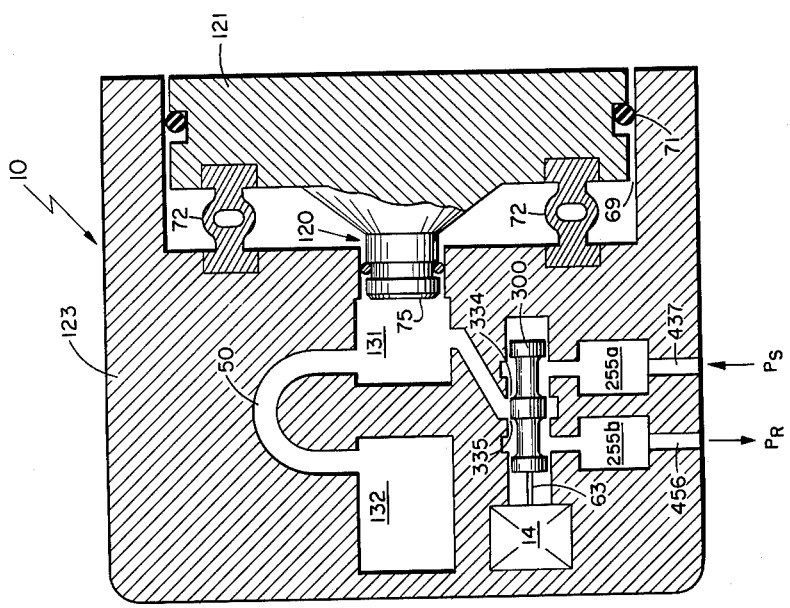
Figure 10:
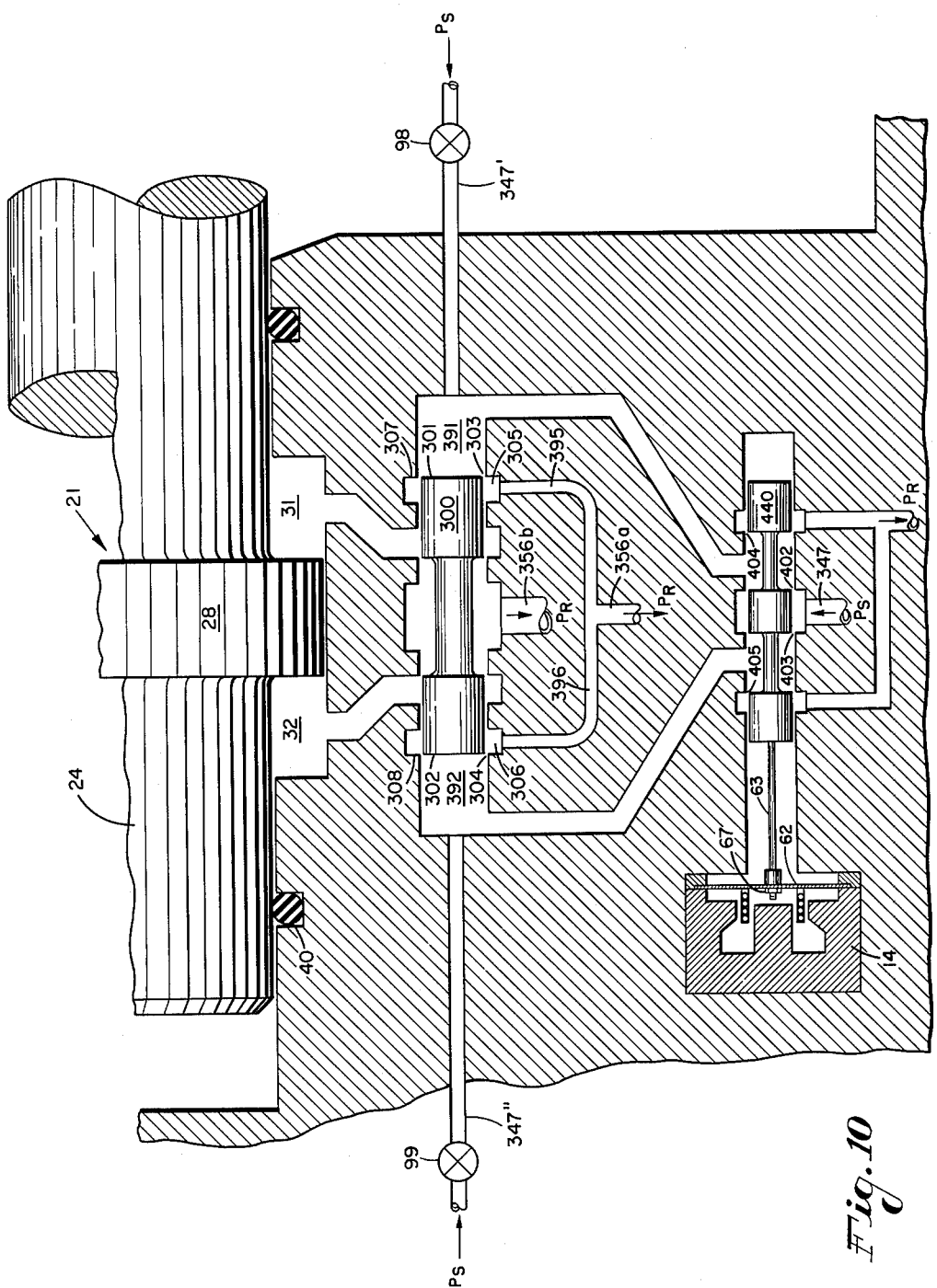

FIG. 7 discloses a transducer in central cross-section which differs essentially from that of FIG. 6 in that two radiating means are driven in push-pull;

FIG. 8 illustrates a transducer in cross-section having two valving stages;

FIG. 9 discloses a device in cross-section incorporating push-pull modulation and single-ended coupling means wherein the modulation occurs on both halves of the cycle in the drive cavity associated with the coupling means; and FIG. 10 illustrates in central cross-section a two-stage device incorporating means for maintaining the power stage statically in its null position.

Figure 1:
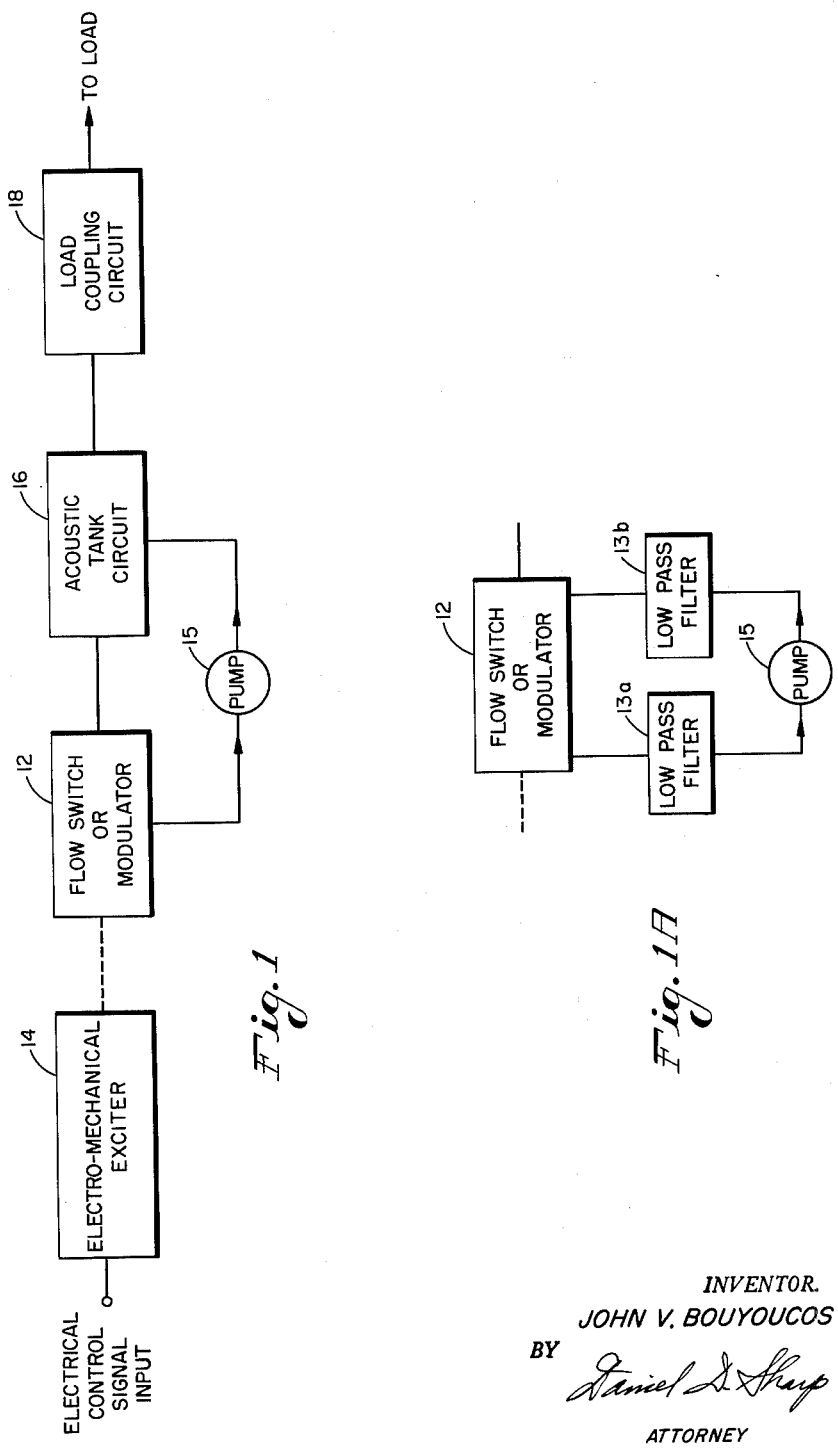
FIG. 1 is a block diagram showing schematically the principle of operation of the electro-hydroacoustic transducer according to the invention.

Referring to FIG. 1 of the drawing, a schematic diagram of an electro-hydroacoustic transducer is shown wherein energy in the form of a fluid flowing under pressure is converted into acoustic energy which may be delivered to a suitable acoustic load. This conversion of unidirectional flow energy to acoustic energy is accomplished by means of a flow switching or modulating element 12 interposed in the path of a flowing fluid which is set in motion within a closed hydraulic system by a pump 15. The timing and magnitude of the switching action is determined by an electrical control input signal which may feed an electromechanical exciter 14; the latter actuates the flow switching device. The mechanical link between the exciter 14 and the flow switch 12 is indicated by a dashed line.

Interrupted pulses of flow energy, as generated by the switching element 12, are supplied to a resonant acoustic tank circuit 16. A portion of the acoustic energy is stored in the tank circuit, while a further portion may be transferred through a load coupling circuit 18 to a terminal load.

In some instances, as shown in FIG. 1A, the fluid pump may be connected between different portions of the switching element 12 through acoustic low-pass filters 13a and 13b, which isolate the acoustic circuit from the unidirectional fluid flow circuit. In the system of FIG. 1, however, the fluid flows through a portion of the acoustic tank circuit; in this case, the fluid is introduced into the acoustic tank circuit at a region where there is zero pressure variation, so that the acoustic portion of the system is isolated from the hydraulic system.

Figure 2:
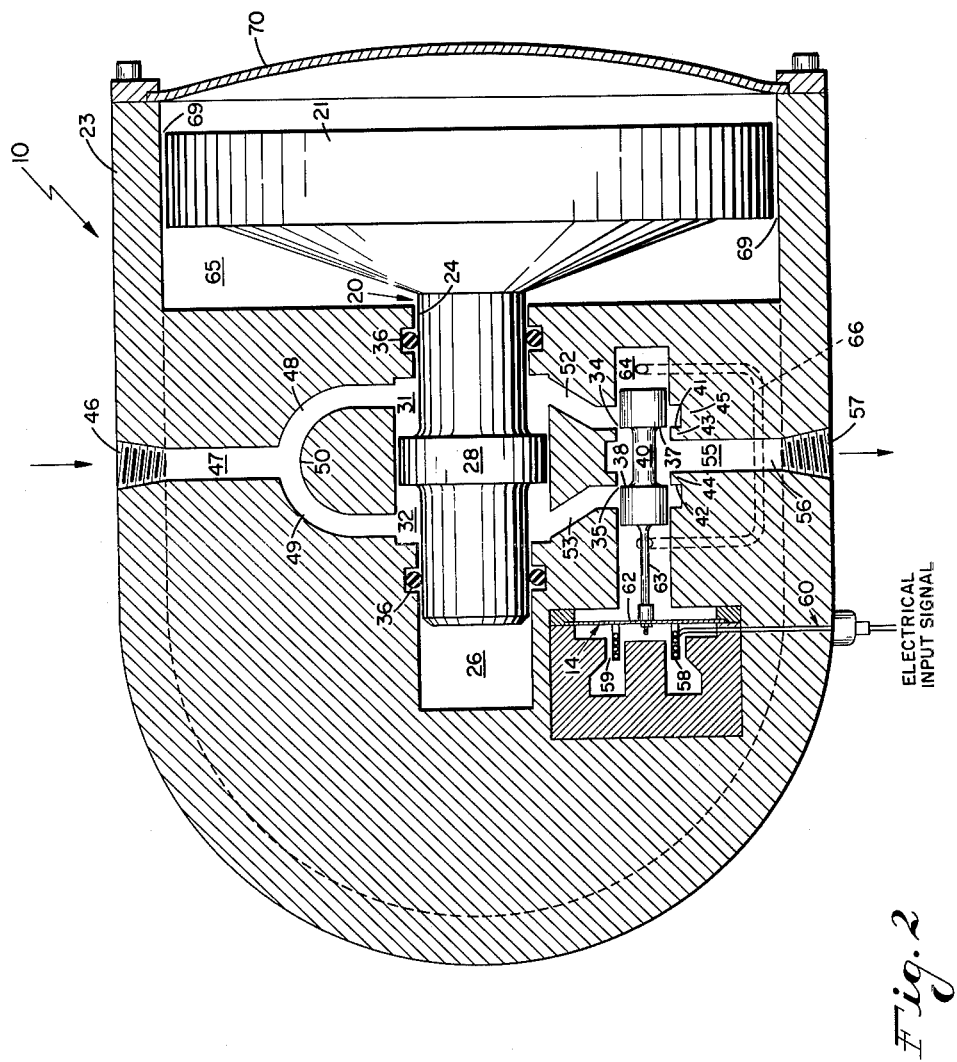
FIG. 2 is a central cross-sectional view of an electro-hydroacoustic transducer employing push-pull flow modulation and push-pull drive of the power output coupling means.

FIG. 2 illustrates one embodiment of an electro-hydroacoustic transducer according to the invention. The transducer 10 of FIG. 2 consists of a movable piston assembly 20 which includes a piston radiator 21 forming one end of a stationary housing 23; the housing 23 contains the structure which performs the hydroacoustic amplification. The piston radiator 21, also referred to simply as the piston, forms an extension of the shaft 24 of piston assembly 20 and is free to move as a rigid body axially with respect to cylindrical bore 26 in consequence of acoustic pressure signals generated in drive cavities 31 and 32 and acting in push-pull on drive flange 28 of piston assembly 20. These push-pull pressures are developed by the asymmetrical modulation of the flow of a hydraulic fluid through variable area orifices 34 and 35 defined by the metering rims 37 and 38 of movable valve 40 and the corresponding rims 41 and 42 of the inwardly extending portions 43 and 44, respectively, of stationary port structure 45. The hydraulic fluid enters under pressure at inlet 46 and passes through inlet line 47 and symmetrical branches 48 and 49 to enter respective cavities 31 and 32. The direction of fluid flow through the housing 23 is indicated in FIG. 2 and the various figures of the drawing by arrows. The branches 48 and 49 combine to form a loop 50 whose function will be described more fully subsequently. From cavities 31 and 32 the fluid passes through ports 52 and 53 to respective orifices 34 and 35 from whence the flow exits at reduced pressure into a discharge chamber 55. The latter may be integral with an outlet line 56 communicating with exit 57. Seals 36 prevent leakage of fluid from drive cavities 31 and 32 into the larger cavities 26 and 65. Accordingly, the loop 50 and the various chamber orifices provide a path for the flow of fluid under pressure through the housing.

Valve 40 may be driven axially past stationary port structure 45 by means of an electromechanical force generator 14 which may include a moving coil 58 free to move in magnetic gap 59 when energized by an electrical control input signal supplied to coil 58 through a lead-in assembly 60. The exciter coil 58 is wound on a portion of a spider 62. The movement of coil 58 is communicated to valve 40 through a connecting rod 63. If the resonant frequency defined by the mass of the moving system and the stiffness of the spider is placed above the operating frequency range of the transducer 10, the displacement of valve 40 will be directly proportional to, and in phase with, the input current. In moving in reciprocal fashion within the bore of 64, valve 40 can open orifices 34 and 35 alternately.

The equilibrium position of valve 40 may be such as to create a zero lap condition between rims 37 and 41 and between rims 38 and 42. If the valve 40 is displaced to the right from equilibrium position, the right-hand orifice 34 is opened while the left-hand orifice remains closed. On the other hand, if valve 40 is displaced to the left from its equilibrium position, the left-hand orifice 35 opens while right-hand orifice 34 remains closed. Thus, for a sinusoidal input to the exciter, either orifice can be opened for approximately 50% of an oscillation period of the valve and a class B mode of modulation is obtained.

Although class B operation is achieved with zero lap at each orifice between the associated metering rim of the valve and the corresponding rim of the port structure, class A operation may be achieved if the metering rims 37 and 38 of valve 40, at equilibrium, underlap respective rims 41 and 42 of the inwardly extending portions 43 and 44 of the port structure 45. In other words, orifices 34 and 35 will be open at both extremities of the valve movement and fluid will flow at all times through both of the orifices 34 and 35. Similarly, if the equilibrium position of valve 40 is biased to an overlap condition relative to the rims of the port structure 45, then each orifice will be closed at equilibrium and will be opened during one cyclical departure from equilibrium. Each orifice then will be open only during a minor portion of each cyclical excursion of the valve. This represents class C operation.

Since all of the orifices offer a resistance to the flow of fluid which varies with displacement of the valve 40, each orifice 34 and 35 can be considered as a variable resistance. The asymmetrical modulation of flow through orifices 34 and 35 can be represented practically in terms of volume velocity sources which inject acoustic volume velocity alternately through ports 52 and 53 into cavities 31 and 32, respectively. Considering the impedance presented to the upstream side of the orifices, the acoustic compliance of cavities 31 and 32 is found to be in parallel with the inertance of feed line loop 50. The parallel relationship results since a variational velocity disturbance generated by an area change at the orifices can give rise either to compression or expansion of the fluid within cavities 31 and 32, or to motion of fluid in loop 50. The combination of cavities 31 and 32 and loop 50 thus constitutes the acoustic tank circuit 16 of FIG. 1. As the pressure variations in cavity 32 are 180 degrees out of phase with the pressure variations in cavity 31, somewhere between cavities 31 and 32 at the nominal operating frequency one expects to find a point of zero pressure variation in feed line 50. This point is used as the feed-in point for hydraulic fluid, thereby reducing the possibility of coupling energy from the acoustic tank circuit of the transducer back into the unidirectional flow source.

Variational volume velocity injection from orifices 34 and 35 into the parallel tank circuit will result in pressure variations therein which, in turn, operate on the drive surfaces of the flange 28 of piston assembly 20 to generate motion of the piston 21 against an external load. The piston radiator 21 is shown backed by cavity 65 filled with a compliant fluid; the compliance of the fluid filled cavity should be such as to resonate with the mass of the combined piston assembly at the design center or nominal operating frequency by which is meant the mean operating frequency of the control signal. As long as piston 21 moves essentially as a rigid body with respect to the compliant fluid in cavity 65, the load coupling circuit is a series resonant circuit, since the compliant fluid must always assume the same velocity as the piston.

The series load coupling circuit should be in resonance at the nominal operating frequency for optimum power transfer from the acoustic tank circuit to the load. In addition, the parallel acoustic tank circuit should simultaneously be in resonance at the nominal operating frequency to enable the orifices to encounter a resistive load. Without the inertance of loop 50, the simultaneous satisfaction of both resonance conditions obviously would be impossible. Because of the presence of the inertance formed by loop 50, however, it is possible to tune the acoustic tank circuit and the load coupling circuit to resonance independently. The acoustic circuit of the transducer thus takes the form of a parallel tuned resonant circuit in combination with a series load coupling circuit and is effectively an L-section bandpass filter.

One advantage of the bandpass filter is that a condition of maximum power transfer to the load is assured, since, at the design center or nominal operating frequency, both the parallel acoustic tank circuit 16 and the series load coupling circuit 18 may be simultaneously at resonance.

Another advantage of such a composite circuit configuration is that, for a given Q of the series branch, a broader bandwidth may be obtained than will be the case in the absence of the parallel resonant tank circuit. Accordingly, the frequency range of the transducer 10 and control signals can be broader. Furthermore, the driving point impedance, as seen from the amplifier orifices, will remain nearly resistive over the major portion of the passband. This characteristic of a constant-$k$ filter is particularly useful since the power conversion efficiency of the drive amplifier can remain high over the passband.

The presence of loop 50 further acts as a short circuit between drive cavities 31 and 32 at zero frequency and prevents thrust being built up across the opposite drive areas of the drive flange 28 of piston 21, thereby enabling piston 21 to exhibit inherent static stability. In other words, loop 50 acts as an inlet for the operative fluid, as a short circuit at zero frequency across the drive flange 28 of piston assembly 20, and as an important acoustic circuit element in the bandpass filter configuration. Loop 50, furthermore, enables the flow inlet to occur at a null or zero pressure variation point in the acoustic system, thereby minimizing the transfer of acoustic energy back into the hydraulic system.

The transducer of FIG. 2 further includes a loop 66 which is intended to present an acoustic short circuit between opposing ends of valve 40 to minimize the driving impedance of said valve. A barrier 70 which may be of flexible material, such as rubber, is transparent acoustically; this barrier separates the external fluid—which may be sea water—from the fluid in backing cavity 65, which may be the same hydraulic fluid used to operate the transducer. The gap 69 between the piston 21 and the housing 23 allows the static pressure to be the same on both sides of piston assembly 20, thereby allowing the latter to be balanced statically. If, for example, the transducer 10 of FIG. 2 is to be operated beneath the surface of the sea, the piston assembly can be pressure equalized at any submergence depth to the external pressure through barrier 70. However, the acoustic impedance of gap 69 is intended to be high compared either with the compliant reactance of cavity 65 or with the acoustic radiation impedance presented to radiator 21. In addition, if the fluid in gap 69 is mass controlled, and if the resonant frequency defined by the mass of the fluid in the gap acting with the stiffness of the fluid in cavity 65 is below the operating frequency, then the motion of the fluid in the gap will be in phase with the piston motion. Under these circumstances, the gap functions somewhat in the manner of the port of a bass reflex loudspeaker.

If the fluid in cavity 65 is chosen to be identical with the hydraulic circuit fluid, the seals 36 may be removed, allowing a small leakage flow continuously into cavity 65. In these circumstances, cavity 65 must have a return connection to the reservoir so that static pressures do not build up therein.

Figure 3:
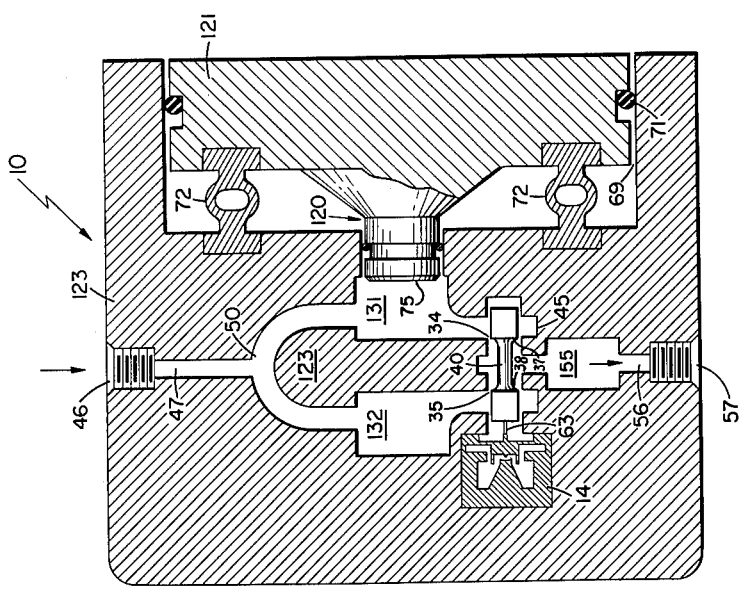
FIG. 3 is a central cross-sectional view of a transducer embodying a push-pull valve amplifier driving a single-ended radiating structure.

FIG. 3 is a view of a modification of the device of FIG. 2 in which push-pull flow modulation or switching of fluid flow is achieved, as in FIG. 2, but wherein a single-ended power output coupling device is employed, in contrast to the push-pull drive of the power output coupling piston in the device of FIG. 2.

In this figure, and in the remaining figures of the drawings, corresponding elements will be indicated by the same reference numeral as in FIG. 2. In those instances wherein the element is substantially equivalent to, but of somewhat different construction than, the element of FIG. 2, such element will be designated by a reference numeral differing from that in FIG. 2 by some multiple of 100.

The transducer 10 of FIG. 3 is contained within a housing 123 into which hydraulic fluid is introduced under pressure at inlet 47 and from which the fluid exhaust is at reduced pressure at outlet 56. Terminating at one end of the housing is a massive radiating piston assembly 120 having a mass which may resonate as a rigid body with a total mechanical stiffness of a plurality of springs 72 at the center frequency of operation. The springs 72 will replace the compliance presented by the liquid contained in cavity 65 of FIG. 2. In contrast to the device of FIG. 2, wherein the net static thrust on the piston assembly is zero, an average thrust is exerted on the piston of FIG. 3 owing to its exposure to the high pressure present in cavity or chamber 131. Bias against this net thrust is supplied by the springs 72. The dynamic force driving the radiating member 121 is derived from acoustic pressure signals in acoustic cavity 131 which act on the exposed driving surface 75 of the coupling assembly 120 and which are generated by the valve 40. Seals 71 are provided in peripheral grooves in piston radiator 121 to prevent leakage of hydraulic fluid past the space between piston radiator 121 and the housing 123. The valve originates the required drive pressure signals by modulating the flow of fluid through acoustic cavities or chambers 131 and 132 in response to a control electrical signal input, not shown in FIG. 3 since it may be brought out of the housing 123 in a plane perpendicular to the paper. The spool type valve 40 is free to move back and forth in response to a force applied by the electromechanical device 14 through connecting rod 63. The hydraulic circuit or fluid path of the transducer may be traced from inlet 47 to the mid-point of loop 50, through acoustic cavities 131 and 132 and thence to annular orifices 34 and 35 formed, respectively, between the circular metering rim 37 of valve 40 and corresponding metering rim 41 of stator port structure 45 and between metering rim 38 of valve 40 and metering rim 42 to stator port 45. The flow then enters discharge cavity 155 on the way to exit 57.

If, as shown in FIG. 3 the valve is normally in a zero lap condition at both orifices 34 and 35 so that, for no input current, metering rim 37 of valve 40 is in line with metering rim 41 and metering rim 38 is in line with rim 42, a displacement of valve 40 to the right will cause a proportional opening of orifice 34, while orifice 35 remains closed; similarly, a displacement of valve 40 to the left results in orifice 35 opening and orifice 34 remains closed. For a sinusoidal input, therefore, each of the orifices 34 and 35 is thus open for 50% of the signal period and class B operation is attained. It is evident that, as in the case of FIG. 2, class A or class C amplification can be achieved by appropriate biasing of the equilibrium position of valve 40 to an underlap condition or an overlap condition, respectively, relative to stator port 45.

The transducer of FIG. 3, while embodying a push-pull amplifier, drives a single-ended load coupling circuit which may be identified as the resonant piston spring assembly 121, 72. The acoustic tank circuit of the transducer of FIG. 3 may be considered to comprise the combination of cavities 131 and 132 and loop 50. The acoustic tank circuit is terminated in a radiation impedance whose parameters may be frequency dependent. The acoustic tank circuit is driven by a source having characteristics of a variable resistance or modulating element and this circuit is shunt fed unidirectional energy through the feed line inertance of loop 50 from the constant pressure hydraulic supply, which is analogous to an electrical battery.

Since the device of FIG. 3 is a push-pull amplifier, that is a device utilizing push-pull switching, cavities 131 and 132 have been made equal in size to accommodate push-pull flow modulation and both cavities are ported by valve 40 at orifices 34 and 35 on alternate halves of the modulation cycle. Because of the symmetry of the tank circuit of the device of FIG. 3, the hydraulic inlet line 47 may bisect the feed line 50. For the same area of piston exposed to the drive cavity or cavities, the driving force exerted on the piston in the device of FIG. 3 is one-half that for the device of FIG. 2. This condition results from the fact that acoustic forces are exerted on both faces of flange 28 of the piston of FIG. 2 but only on the one face 75 of the piston of FIG. 3. The device of FIG. 3 is of simpler mechanical construction of FIG. 2 in that the piston assembly communicates directly with one of the cavities 131 and no flange, such as flange 28 in FIG. 2, is required in the piston assembly 20.

Figure 4:
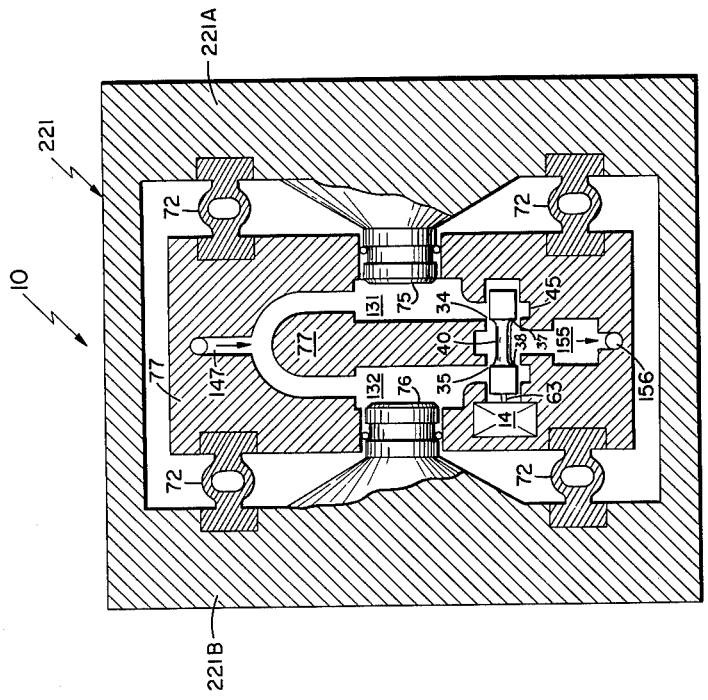
FIG. 4 is a central cross-sectional view showing a transducer embodying a push-pull valve amplifier driving a double-ended radiating assembly in push-pull.

The transducer shown in FIG. 4 is similar to those of FIGS. 2 and 3 in that the valving is of the push-pull variety and also in that the acoustic tank circuit is identical. In the device of FIG. 4, as in the device of FIG. 3, mechanical springs 72 are used for compliance in the load coupling circuit, rather than the fluid-filled cavity 65 of FIG. 2.

The distinction between the device of FIG. 4 and the previous devices is that the push-pull amplifier now is coupled to a push-pull or dipole radiating element 221 which comprises two rigidly interconnected portions 221A and 221B. The composite radiating element 221 moves as an integral piston driven in push-pull by the out-of-phase pressure variations in cavities 131 and 132 acting upon drive surfaces 75 and 76, respectively, of the composite radiating element 221. The central structure 77 which houses the electromechanical exciter 14, as well as the flow switch and the acoustic tank circuit, is now isolated from the external housing by a plurality of spring elements 72. When the portion 221A of piston radiator 221 undergoes a momentary motion to the right, the central structure 77 moves to the left of its neutral position, and vice versa.

FIG. 5 illustrates a transducer which differs from those shown previously in that one of the fluid-filled cavities, namely, cavity 32, is blocked so that single-ended valving is obtained instead of push-pull switching. Except for this feature, the device of FIG. 5 is the same as that shown in FIG. 2. In the device of FIG. 5, the flow of fluid from cavity 31 only is ported to valve 140 through port 52. The acoustic circuit of the transducer of FIG. 5 remains the same as that of FIG. 2, with the exception of the flow modulating source. The device of FIG. 5, like that of FIG. 2, uses a push-pull output coupling circuit, with the pressure variations within cavities 31 and 32 acting upon opposite faces of the piston drive flange 28.

A fundamental distinction between the device of FIG. 5 and that of FIG. 2 is that the former device permits frequency doubling to be obtained by proper construction of the valve 140 relative to port structure 45. For example, as shown in FIG. 5, there is, at equilibrium, a symmetrical overlap of 70% of the valve metering rims 137 and 138 relative to the respective stator port metering rims 141 and 142. During a portion of the valving cycle when the valve 140 is driven to the left of its equilibrium position, fluid flows through orifice 134; on the other hand, during some portion of the rightward excursion of valve 140 from its equilibrium position, fluid flows through open orifice 135. Since each of the orifices 134 and 135 open once during each valving cycle, the frequency of flow modulation will be twice that of the input electrical control signal. In other words, if the peak displacement of the valving means is such that the orifices at opposite ends of the valving means connecting through a common fluid cavity each open once for each oscillation cycle of the valving means, the frequency of the acoustic energy at the amplifier output will be twice that of the input signal. If, on the other hand, the peak displacement of the valving means is never great enough for one of the two orifices to open during the oscillation cycle of the valving means, the frequency of output energy is equal to the frequency of the input signals. Frequency doubling can be accomplished only in those devices which, like that shown in FIG. 5, employ single-ended valving; other examples of such devices are those shown in FIGS. 6 and 7.

Although valving could be accomplished if the central land of valve 140, as shown in FIG. 5, were connected directly to the connecting rod 62 instead of being connected to the left-hand land of valve 140, practical consideration dictates that outer lands be disposed on opposite sides of a central land in order that there be no net static thrust exerted upon the central land by virtue of its exposure to the high pressure side of the fluid path. With the three-land valves shown in FIG. 5 any force exerted on the oppositely disposed lands are in opposition and, consequently, no net thrust is exerted on the valve.

It should be noted that the same type operation as achieved by the device of FIG. 5 can be obtained by overlapping the left-hand land of valve 40 of FIG. 2 so that it never permits the left-hand port 53 of FIG. 2 to pass fluid.

FIG. 6 discloses a device which differs essentially from that of FIG. 5 in that the output coupling device is single-ended. In this respect, the device of FIG. 6 is like that shown in FIG. 3. Since push-pull flow modulation is not accomplished in the device of FIG. 6, the cavities or chambers 131 and 132 need not be symmetrical, as in the case of the device of FIG. 3. Since cavity 332 is shown larger than cavity 131 in FIG. 6, the zero pressure point (acoustic ground) along loop 650 will be nearer the larger cavity 132. The feed line 47 then will connect to loop 650 at a point between the entrance to cavity 132 and the midpoint of loop 650.

FIG. 7 discloses a single-ended amplifier which, instead of being coupled to a single-ended piston radiator as in FIG. 6, is coupled to a double-ended piston radiating assembly wherein the individual pistons 321 and 321' move in push-push. The device of FIG. 7 distinguishes from that of FIG. 4 in that the latter disclosed push-pull flow modulation and in that the two portions 221A and 221B of FIG. 4 move as a unitary structure instead of independently, as in the case of the device of FIG. 7. It should be noted that the inertance line 150 in FIG. 7 is no longer a loop, as in the case of the inertance loops in FIGS. 2–6.

Whereas the single-ended amplifier may be somewhat easier to construct, the inclusion of push-pull amplification will improve the response of the transducer to non-symmetrical waveform inputs and will increase its power handling capability by a factor of two for the same valve stroke.

The devices of FIGS. 2–7 have been illustrated, for the sake of simplicity, with a single stage valve amplifier. For high power devices, a multistage valve amplifier is generally required; such a device is shown in FIG. 8. It should be understood, however, that a multistage valve combination of the type shown in FIG. 8 may be incorporated into any of the devices previously described.

The housing 323 of FIG. 8 includes a web-like structure 80 extending diametrically into the large fluid-filled chamber 165 which serves as a backing compliance for the piston assembly 20.

The acoustic power output of the device of FIG. 8 is developed by virtue of the motion of the substantially rigid piston radiator 21 which is driven by push-pull pressures generated in drive cavities 31 and 32 by the two-stage valve amplifier including pilot valve 240 and power valve 200. Hydraulic fluid at constant supply pressure is introduced at an inlet line 247 midway between the amplifier stages and the fluid discharges to the reservoir through outlet lines 256a and 256b. The amplifier is actuated by moving coil transducer 214 attached to the first, or pilot valve stage 240. The exciter 214 may include a pair of coils 258a and 258b wound in opposite directions upon two spiders 263a and 263b attached to opposite ends of pilot valve 240. An electrical input signal from a remote point outside the housing 323 provides excitation for the coils. It is obvious that only one coil may be used instead of the two shown in FIG. 8; however, the use of two magnet-coil assemblies may provide improved drive characteristics.

The valving stages 240 and 200 of FIG. 8 incorporate closed center, four-way spool valves. The term "closed center" means that all orifices are substantially closed when the valve is in its center or null position. The term "four-way" refers to the fact that the circuit of the valve is such that the flow resistance of the four orifices 82, 83, 84 and 85 of valve 240, and the four orifices 86, 87, 88 and 89 of valve 200, will vary simultaneously in response to motion of the spool valve. If the pilot spool valve 240 is displaced to the right, the flow resistance of orifices 83 and 85 will decrease while the resistance presented by orifices 82 and 84 will increase. Consequently, there is developed across the driving area 91 of power spool valve 200 a force unbalance tending to displace valve 200 to the right. This resulting displacement modifies the flow resistance presented by the orifices 86, 87, 88 and 89 of the main ports and, in turn, allows a forced unbalance to develop across the area 94 of the drive flange 28 of piston 21, forcing the piston to move to the left.

If the pilot valve 240 moves to the left, on the other hand, the flow resistance of orifices 83 and 85 will increase while the resistance offered by orifices 82 and 84 will decrease. The resulting force developed across driving area 92 of valve 200 is such as to displace valve 200 to the left. Thus, a force is exerted on the surface 95 of drive flange 28 of piston 21 causing the piston to move to the right. The resulting motion of the piston conveys power to an external load.

Although the valving arrangements shown in FIG. 8 may appear similar to that of the conventional hydraulic servo valve, several differences should be noted. The conventional electrohydraulic servo valve normally is used for position control and is an integrating device wherein the net volume of fluid passed by the valve is the integral of the valve's position history about a null or balanced flow point. In position control, the valving stages always operate in the vicinity of this null point and, since high sensitivity about this position is desired, extremely close tolerances and knife-edged metering orifices are required. In the case of acoustic power generation by the valving means shown in FIG. 8, the attainment of high signal power levels requires large valve stroking and the valve will pass the null position with maximum velocity. Consequently, clearances can be enlarged and the orifices may be machined under less precise conditions. The complexity of conventional electrohydraulic servo valves generally follows from the requirement for obtaining closed loop performance. Feedback of a mechanical or an electromechanical nature around one or more stages of an electrohydraulic amplifier is essential if absolute control over output position is to be maintained. From the standpoint of acoustic power generation, the variational velocity of the output member (piston radiator) is of greater concern than its absolute position. Open loop performance is possible in the case of acoustic power generation provided simple and practical means are used to insure adequate stability of the piston and valving means; consequently, considerable simplification and increased reliability can be obtained. Whereas the electrohydraulic servo mechanism is essentially a direct current feedback amplifier in which force and position control down to zero frequency is required, the requirements in the case of acoustic power generation—particularly in the case of the amplifier according to the invention—are limited to alternating current power amplification over a rather limited bandwidth.

The response of the piston coupler in FIG. 8 to static flow, as might develop between cavities 31 and 32 as a result of minor drifts in the average position of the main spool valve 200, has been eliminated by the presence of the loop 50 interconnecting the drive cavities. This loop presents a short circuit between the cavities at zero frequency, yet presents a finite impedance to alternating pressure differentials in the operating frequency range. The presence of loop 50 provides the stabilizing feature which, in conventional hydraulic systems, is accomplished by electromechanical or mechanical feedback loops. It is evident that the loop 50 limits the bandwidth of the system according to the invention, since, in addition to zero static response, the loop 50 presents a short circuit when its length is one wavelength in the contained fluid. The effect of loop 50 thus is to convert the system from a direct current amplifier to an alternating current amplifier of limited bandwidth.

The acoustic circuit of the device of FIG. 8 is similar to that shown in FIG. 2.

Single-ended and push-pull flow modulating means have been described heretofore which have been coupled interchangeably to single-ended, push-pull or push-push coupling structures. In the case of push-pull flow modulation, as applied to single-ended coupling means as exemplified by the device of FIG. 3, the power conversion performance of such a system may be compromised when the acoustic tank circuit and the output coupling structure are designed for extremely broad bandwidth response. This results from the fact that the combination of cavities 131 and 132 and loop 50 in the device of FIG. 3, under heavily loaded conditions, does not enable acoustic energy developed in cavity 132 by the flow modulation through orifice 35 to be transferred through loop 50 in such phase as to aid effectively the energy developed in cavity 131 by the flow modulation through orifice 34, in driving the output coupling assembly 120. In order to achieve the push-pull flow modulation with single-ended coupling under relatively broadband conditions, it may be desirable to have the push-pull modulation occur at the cavity which is contiguous with the output coupling means 120. Such an arrangement is shown in FIG. 9.

By means of the arrangement of FIG. 9, push-pull modulation can be associated with the cavity 131 contiguous with the piston coupler 120 during the entire input signal cycle rather than having to depend for half of the input signal cycle upon energy being introduced from the back cavity 132 by way of loop 50 into the active cavity 131 in the proper phase to aid excitation of the piston 121, as in the device of FIG. 3.

In the device of FIG. 9, one or the other of orifices 334 or 335 is always open to modify the pressure in cavity 131 in accordance with the input signal. If, for example, valve 300 moves to the left, the supply orifice 334 opens, fluid passes therethrough from supply line 437 and the pressure in drive cavity 131 approaches the supply pressure. On the other hand, a movement of the valve to the right causes orifice 335 to open thereby permitting fluid to pass therethrough to the low pressure side of the fluid pump by way of return line 456; the pressure in cavity 131 then moves toward the return pressure.

The devices of FIGS. 3 and 9 are able to respond to non-periodical input signals, whereas a device such as shown in FIG. 6 which incorporates both single-ended modulation as well as single-ended coupling means, may cause distortion of the input signals, in certain broadband applications, during a portion of the input cycle.

FIG. 10 illustrates a transducer having a two-stage valve and involving a technique for establishing and maintaining the equilibrium position of the power stage valve, such as valve 200 of FIG. 8, without requiring mechanical elements, such as springs, which would fail under repeated stroking of the valve. Although the technique shown in FIG. 9 may be used with the four-way spool valves 240 and 200 of FIG. 8, the pilot valve 440 of FIG. 10 is of the type shown in FIG. 5 while the power valve 300 of FIG. 10 is of the type shown in FIGS. 2–4.

In the absence of any centering mechanism, a slight unbalance in the null position of the pilot valve 440 of FIG. 10 would result in an unbalance of forces on the end faces or rims 301 and 302 of power valve 300, thereby causing it to drift in one direction or the other. A stable null position of valve 300 is obtained by the action of variable area orifices 303 and 304 defined by the end rims 301 and 302 of valve 300 and the corresponding rims 307 and 308 of grooves 305 and 306. Normally, the average pressure in cavities 391 and 392 at the ends of the power spool is about midway between the supply and return pressure, as determined by the pressure drop across orifices 402, 403, 404 and 405 of the four-way pilot valve 440. If the average pressures in the cavities 391 and 392 are unequal, the power valve 300 obviously will drift. If, for example, the power valve 300 tends to drift to the left, orifice 303 will tend to open and orifice 304 will tend to close. Since orifice 303 returns to the low pressure side of the hydraulic system through line 395 and output connections 356a, the more orifice 303 opens the greater will become the flow through that orifice, the greater will become the pressure drop across supply orifice 402 because of its interposition in the flow path, and the lower will be the pressure in cavity 391. On the other hand, the flow will be reduced at the left orifice 304 of power valve 300. This reduction in flow will be accompanied by a reduction in the pressure drop across the left supply orifice 403 of the pilot valve 440, and will result in an increase of pressure in cavity 392. In other words, a drift to the left of power valve 300 is accompanied by an increase in pressure in the left-hand cavity 392 and a reduction in pressure in cavity 391, tending to force the valve 300 back to the right. The influence of the shunting orifices 303 and 304 is to provide a high gain feedback amplifier to stabilize the equilibrium position of power valve 300 so that its outer faces 301 and 302 are substantially at zero lap condition with respect to the outer rims 307 and 308 of grooves 305 and 306, all respectively, provided that the pilot valve 440 is in proper adjustment. The null position of pilot valve 440 may be adjusted either mechanically, as by adjusting the length of connecting rod 63 which is threaded at one end and passes through a bushing attached to spider 62 and a nut 67, or by variation of a direct current bias voltage supplied to the exciter coil 58.

Lines 395 and 396 on the low pressure side of orifices 303 and 304 are intended to be long enough and of sufficiently small diameter so that over the frequency range that the valve stages may be driven they exhibit an acoustic impedance that is large compared with the mass reactance of the valve 300. Thus, whereas orifices 303 and 304 can act to center the power valve 300 on a static basis, they are prohibited from influencing its dynamic behavior because the flow through the orifices 303 and 304 cannot vary appreciably over the period of valve motion owing to the high terminal reactance.

It is evident that for orifices 303 and 304 to be effective in centering valve 300, it must be possible for the static pressures to equalize in cavities 391 and 392 at some position of valve 300 within the effective control range of orifices 303 and 304. If, for example, pilot stage valve 400 is assumed to be out of null adjustment, and orifice 403 is closed such that the pressure in cavity 392 is essentially zero, then the centering capabilities of the two orifices 303 and 304 are highly, if not entirely, compromised. In order to avoid the above effect, supply orifices 402 and 403 of pilot valve can be slightly underlapped, so that variations in the null position of the pilot valve will not close off the flow through one side. In addition, therefore, it is desirable to supply fluid independently and directly to cavities 391 and 392, and hence to power valve centering orifices 303 and 304, through separate adjustable flow resistances, such as valves 98 and 99, and supply lines 347' and 347" of high acoustic impedance. In other words, inlet line 347 of FIG. 10 may be supplemented by two separate lines 347' and 347", each passing through the housing and communicating with a different one of cavities 391 and 392. The adjustable resistances 98 and 99 then are essentially in parallel with respective pilot valve supply orifices 402 and 403 and can, therefore, be employed to establish the desired equilibrium position of the power stage valve 300, essentially independently of the equilibrium position of the pilot valve. Again, the high reactance lines 347' and 347" would isolate the static positioning circuit from the dynamic circuit of the two stage valve assembly.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:
1. An accoustic vibration transducer for generating acoustic vibrations over a certain frequency range, said transducer comprising
   (a) a housing having a path for the steady flow therethrough of a fluid under pressure,
   (b) fluid flow switching means for modulating the flow of fluid through said path and converting a portion of the steady flow energy of said fluid into acoustic vibration energy within said frequency range, said fluid flow switching means comprising
      (1) a valve disposed in said path, and
      (2) said housing having a chamber communicating with said path and acoustically coupled to said switching means, said chamber presenting an acoustic compliance over said frequency range,
   (c) a line communicating with said chamber and presenting an acoustic inertance over said range when filled with said fluid,
   (d) said line and chamber defining an acoustic tank circuit having a resonant frequency within said range,
   (e) means for coupling acoustic vibrations to an external load comprising
      (1) a compliantly mounted mass acoustically coupled to said chamber,
      (2) said mounted mass defining an acoustic circuit also having a resonant frequency within said range, and
   (f) said load coupling means and said chamber and fluid line defining an acoustic band pass filter which has a passband extending over said range.

2. An acoustic vibration transducer for generating acoustic vibrations over a certain frequency range, said transducer comprising
   (a) a housing having a path for the steady flow therethrough of a fluid under pressure,
   (b) a chamber communicating with said path and filled with said fluid and presenting an acoustic compliance over said range,
   (c) fluid flow switching means disposed in said path and acoustically coupled to said chamber for converting the steady flow energy of said fluid into acoustic energy in said frequency range which acoustic energy is coupled into said chamber, said switching means comprising
      (1) a valve disposed in said path,
      (2) means responsive to an electrical control signal for vibrating said valve, (d) a fluid filled conduit connected to said chamber and defining an acoustic inertance over said range, (e) a mass element coupled to said chamber for transferring acoustic energy therein to an external load, (f) means for compliantly mounting said element and defining an acoustic load coupling circuit therewith which is resonant at the mean frequency of said range, and (g) said conduit and said chamber defining an acoustic tank circuit and with said load coupling circuit defining an acoustic bandpass filter for transferring said acoustic energy to said load.

3. An acoustic vibration transducer for generating acoustic vibrations over a certain frequency range, said transducer comprising (a) a housing having a path therethrough for a fluid under pressure (b) said housing having a chamber communicating with said path and presenting an acoustic compliance over said range, (c) fluid flow switching means for modulating the flow of said fluid and converting at least a portion of the steady flow energy into acoustic energy within said range, said switching means comprising (1) a valve disposed in said path, (2) means responsive to a control signal for vibrating said valve, (d) a fluid-filled conduit connected to said chamber and presenting an acoustic inertance over said range, which inertance is in parallel with said compliance and defines an acoustic tank circuit, (e) at least one radiating element having a mass, (f) compliant means for mounting said element in said housing at least partially in said chamber, said compliant means and element mass defining an acoustic circuit resonant at a frequency within said range, and (g) said tank circuit and said resonant circuit defining an acoustic filter circuit.

4. An acoustic vibration transducer for generating acoustic vibrations over a certain frequency range, said transducer comprising (a) a housing having a path for the steady flow therethrough of a fluid, (b) said housing having a pair of chambers communicating with said path, which chambers present acoustic compliance over said range, (c) a fluid-filled conduit communicating with said chambers and presenting an acoustic inertance over said range, (d) said conduit and said chambers defining an acoustic tank circuit which is resonant at the mean frequency of said range, (e) fluid flow switching means for modulating the flow of fluid and converting said flow energy into acoustic energy within said range, said switching means comprising (1) a valve disposed in said path, (2) means responsive to a control signal for vibrating said valve, (f) load coupling means for transferring said acoustic energy to an external load, said coupling means comprising, (1) a mass element, (2) compliant means for mounting said element in acoustically coupled relationship with the fluid in at least one of said chambers, said element and compliant means defining an acoustic circuit which is resonant at said mean frequency, and (g) said tank circuit and said resonant circuit defining an acoustic bandpass filter for transferring acoustic energy to said load.

5. An acoustic vibration transducer comprising (a) a housing, a fluid path through said housing for the steady flow therethrough of a fluid medium under pressure, a portion of said path defining a loop having a given inertance, another portion of said path including a pair of chambers shunting said loop to define an acoustic tank circuit, said tank circuit having a certain passband, (b) a fluid flow switching means including a movable valve coupled to one of said chambers for modulating repetitively the flow of said fluid medium through said tank circuit, (c) means for driving said valve in response to an external signal for converting a portion of the steady flow of said fluid medium into acoustic energy lying within the frequency passband of said tank circuit, (d) a radiating element coupled to at least one of said chambers for transferring acoustic energy developed in said one chamber to a load, and (e) means for compliantly mounting said radiating element to define a series resonant load coupling circuit with said radiating element having a passband within which said acoustic energy lies, said acoustic tank circuit and said load coupling circuit defining an acoustic filter circuit with a predetermined frequency passband determined by the resonant frequencies of said acoustic tank circuit and said load coupling circuit.

6. An acoustic transducer according to claim 4 wherein said mass element comprises a member having a flanged portion, said housing having a cavity in which said member is disposed, said chambers being respectively defined by the opposite shoulders of said flanged portion and the walls of said cavity at the opposite ends thereof.

7. An acoustic vibration transducer for generating acoustic vibrations over a certain frequency range, said transducer comprising (a) a housing having a path for the steady flow therethrough of a fluid under pressure, said path having an inlet and an outlet, (b) said housing having a pair of chambers which present acoustic compliance over said frequency range when filled with said fluid, (c) said housing having a loop channel interconnecting said chambers and presenting an acoustic inertance over said frequency range when filled with said fluid and defining with said chambers an acoustic tank circuit, (d) said path including a portion connecting said inlet with said loop, (e) fluid flow switching means for modulating the flow of said fluid and converting a portion of the steady flow energy into acoustic energy within said frequency range, said switching means comprising, (1) a valve member disposed in said path between said outlet and at least one of said chambers, (2) means responsive to a control signal for vibrating said valve, (f) load coupling means for transferring said acoustic energy to an external load, said coupling means comprising (1) a mass element having a portion coupled to said one chamber, (2) means for compliantly mounting said mass element in said housing, said mounting means and said element defining an acoustic circuit resonant at a frequency in said range, and (g) said resonant acoustic circuit and said tank circuit defining an acoustic bandpass filter for transferring said acoustic energy to said load.

8. An acoustic transducer according to claim 7 wherein said path includes portions between said outlet and both of said chambers, and wherein said valve is disposed in both said last named portions, said valve including means for opening one of said portions while closing the other, during each cycle of vibration thereof so as to provide push-pull modulation of the flow of fluid through said chambers, said mass element having portions coupled to both of said chambers.

9. An acoustic transducer according to claim 7 wherein said mass element comprises a pair of piston radiating elements each exposed to the fluid in a different one of said chambers and each rigidly interconnected with the other.

10. An acoustic vibration transducer comprising
   (a) fluid flow switching means, at least one acoustic chamber formed on one side of said fluid flow switching means, said chamber having a given acoustic compliance,
   (b) means including a loop having a given inertance for introducing a steady flow of a fluid medium under pressure into said chamber and defining therewith an acoustic tank circuit having a resonant frequency,
   (c) discharge means communicating with said chamber through said fluid flow switching means for discharging said fluid medium therethrough, said fluid flow switching means including a movable valve positioned in cooperative relationship with said chamber for modulating repetitively said steady flow of said fluid medium through said chamber to convert said steady flow of said fluid medium into acoustic energy lying within the passband of said tank circuit,
   (d) coupling means defining a resonant acoustic circuit having a passband within which said acoustic energy lies, said coupling means comprising at least one member compliantly mounted with respect to said chamber and coacting with said fluid medium in said chamber to couple acoustic energy from said transducer to an external load.

11. An acoustic vibration transducer for generating acoustic vibrations over a certain frequency range, said transducer comprising
   (a) a housing having a path for the steady flow therethrough of a fluid under pressure, said path having an inlet and an outlet,
   (b) said housing having a pair of chambers which present acoustic compliance when filled with said fluid,
   (c) said housing having a channel for coupling at least one of said chambers to a region of said path between said inlet and outlet,
   (d) a loop conduit interconnecting said chambers, said loop presenting an acoustic inertance which with said chamber compliance define an acoustic tank circuit resonant at a frequency in said range,
   (e) fluid flow switching means for modulating the flow of fluid through said path and converting a portion of the steady flow of said fluid into acoustic vibration energy within said frequency range, said switching means comprising,
      (1) a valve disposed in said path between path portions extending respectively to said inlet and outlet thereof,
      (2) means for vibrating said valve in response to a control signal,
   (f) load coupling means for coupling said acoustic energy to a load comprising
      (1) a mass element,
      (2) means for compliantly mounting said element in acoustically coupled relationship with the fluid in one of said chambers, said element and mounting means defining an acoustic circuit resonant at a frequency in said range, and
   (g) said acoustic circuit and said tank circuit defining an acoustic bandpass filter for coupling said energy to said load.

12. The transducer according to claim 11 wherein said valve is a spool having at least one land and a pair of grooves on opposite sides of said land, said land being movable to open and close said path portions, and wherein a channel is provided for coupling the path regions defined by different ones of said grooves to one of said chambers.

References Cited by the Examiner

UNITED STATES PATENTS

| | | | |
|---|---|---|---|
| 2,145,977 | 2/39 | Foster | 137—623 |
| 2,172,066 | 9/39 | Logsdon | 340—5 |
| 2,582,088 | 1/52 | Walthers | 121—46.5 |
| 2,655,939 | 10/53 | Tauscher et al. | 137—623 |
| 2,896,588 | 7/59 | Hayner et al. | 137—623 |
| 3,056,104 | 9/62 | De Kanski et al. | 340—5 |
| 3,105,460 | 10/63 | Bouyoucos | 116—137 |

LOUIS J. CAPOZI, *Primary Examiner.*
ARNOLD RUEGG, *Examiner.*